United States Patent [19]
Rodnunsky et al.

[11] Patent Number: 5,224,426
[45] Date of Patent: Jul. 6, 1993

[54] AERIAL CABLEWAY AND METHOD FOR FILMING SUBJECTS IN MOTION

[75] Inventors: Jim Rodnunsky, Richmond; Trou Bayliss, Vancouver, both of Canada

[73] Assignee: Cablecam Systems Ltd., Richmond, Canada

[21] Appl. No.: 791,655

[22] Filed: Nov. 13, 1991

[51] Int. Cl.$^5$ ............................................. B61B 7/00
[52] U.S. Cl. ...................... 104/112; 104/117; 104/173.1; 104/178; 104/197; 104/202; 104/229; 104/238
[58] Field of Search ............ 104/173.1, 173.2, 178, 104/180, 192, 196, 229, 230, 235, 236, 238, 239, 202, 117, 197, 117.1; 212/76, 77, 97, 99, 110, 111, 112, 117, 119, 122

[56] References Cited

U.S. PATENT DOCUMENTS

| | | | |
|---|---|---|---|
| 2,538,910 | 1/1951 | Miller | 178/6 |
| 2,633,054 | 3/1953 | Black | 88/16 |
| 2,981,205 | 4/1961 | Bannerman et al. | 104/173.1 |
| 3,390,640 | 7/1968 | Couttet et al. | 104/71 |
| 3,437,748 | 4/1969 | Latady et al. | 178/6.8 |
| 3,750,591 | 8/1973 | Makinster et al. | 104/178 |
| 3,935,380 | 1/1976 | Coutta | 178/6.8 |
| 4,027,329 | 5/1977 | Coutta | 358/108 |
| 4,370,932 | 2/1983 | Etcheparre et al. | 104/178 |
| 4,492,168 | 1/1985 | Cellai | 105/30 |
| 4,625,938 | 12/1986 | Brown | 248/550 |
| 4,742,777 | 5/1988 | Tarassoff | 104/173.2 |
| 4,802,416 | 2/1989 | Meindl | 104/192 |
| 4,848,241 | 7/1989 | Kunczynski | 104/173.1 |
| 4,864,937 | 9/1989 | Kunczynski | 104/173.1 |
| 5,113,768 | 5/1992 | Brown | 104/238 |

FOREIGN PATENT DOCUMENTS

| | | | |
|---|---|---|---|
| 1438994 | 11/1988 | U.S.S.R. | 104/229 |
| 1481119 | 5/1989 | U.S.S.R. | 104/239 |

*Primary Examiner*—Mark T. Le
*Attorney, Agent, or Firm*—Robert J. Koch; Peter J. Davis

[57] ABSTRACT

An aerial cableway system for filming subjects in motion over moderate to long distances. An endless cable is tensioned between two support structures in an elongated loop. A cable carriage is suspended from the endless cable and is in contact with both segments of the endless cable at all times. Each segment of the endless cable passes through the cable carriage in opposite directions by wrapping 180° around two drive sheaves for a total cumulative wrap of 360°. Each drive sheave has associated with it a disc brake assembly. The endless cable is driven by a bull wheel mechanism which is located at the base of one of the support structures. As the endless cable is continuously driven the two segments travel in opposite directions. When the disc brakes on one side of the carriage are engaged, the drive sheaves are immobilized on one segment of the endless cable and the carriage is carried along in the direction that the grasped segment of the endless cable is traveling. A camera dolly hangs from the cable carriage, and bears a camera operator's station and a dolly operator's station. The camera dolly can be raised and lowered relative to the carriage in order to follow the contour of the ground beneath. A remote camera may also be lowered and raised from the underside of the camera dolly.

39 Claims, 7 Drawing Sheets

AERIAL CABLEWAY AND METHOD FOR FILMING SUBJECTS IN MOTION

BACKGROUND OF THE INVENTION

1. Field of the Invention

This invention relates to a cable operated aerial tramway and more particularly to a system for supporting and conveying equipment, such as photographic and video equipment, in either direction along an aerial path defined by a cable.

2. Description of the Related Technology

The challenge of continuously filming moving objects traveling over moderate to long distances has, up to the present time, fostered a number of techniques, none of which have been entirely satisfactory. According to one method, a series of fixed location cameras spot the traveling subject at a distance and rotate as the subject approaches and moves past—much in the way that downhill skiing events are currently filmed. According to another method, a camera is mounted on a ground vehicle that travels along side the subject. In still another method, the filming is done from an aircraft, for example, a helicopter.

Unfortunately, each of the known methods for filming an object as it travels over a distance has significant attendant disadvantages. The use of a series of fixed cameras which rotate to follow the subject as it passes by has the disadvantage that for the filming of a subject that travels over considerable distances, a large number of cameras and camera operators are necessary. Further, for each camera, the subject is, for the most part, at some distance from the camera and is only near the camera as it passes by the fixed location, often at considerable speed. The use of ground vehicles has the disadvantage of being severely limited to smooth and firm terrain and is entirely unsuitable for the filming, for example, of downhill skiing events. While the use of rails to carry a vehicle over rough or unsteady terrain has had wide use, even the use of rails is limited to a certain range of terrain.

The use of aircraft has the disadvantage of often being, for safety reasons, too distant from the action to achieve closeups or other desired footage.

Attempts have been made to avoid the aforementioned disadvantages through the use of systems in which a camera is suspended from, and travels along, one or more cables. However, these systems have had the disadvantages of being too noisy and too heavy, of not being able to move back and forth along the same line, or not having sufficient power, speed, acceleration, deceleration, and responsiveness in both directions, or not having sufficiently smooth starting and stopping for the obtaining of good start and end filming frames.

SUMMARY OF THE INVENTION

It is an object of the present invention to provide a system for filming moving subjects travelling over a distance which avoids the disadvantages heretofore encountered.

According to the present invention, a cable operated, cable suspended, aerial tramway adapted for use in filming moving objects, avoids all the disadvantages encountered with the prior methods. The present invention is also contemplated for a variety of other industrial, commercial, and recreational applications.

According to an advantageous feature of the invention, a main support or suspension cable may be provided which is tensioned between two support structures. A cable carriage may be mounted on the cable by two suspension sheaves, and a plurality of idler and drive sheaves may be mounted on the cable carriage. A dolly adapted for carrying equipment and/or people may be suspended from the carriage. According to a further feature of the invention, the dolly may be adapted to carry filming equipment, a camera operator and a dolly operator. A camera operator's station may be built onto the dolly to support the camera operator and filming equipment.

Displacement of the carriage/dolly assembly in either direction along the suspension cable is accomplished through the use of a bull wheel mechanism which drives an endless drive cable. The endless drive cable travels in an elongated loop and passes through the carriage on both segments of its loop. As the cable is driven, one segment passes through one side of the carriage in one direction and the other segment passes through the other side of the carriage in the opposite direction. Each segment of the endless drive cable passes through one side of the carriage by threading through the plurality of sheaves mounted on the carriage.

The interaction between the sheaves and the endless drive cable, described below in the detailed description, is such that there is no slippage. Thus, when the sheaves are prevented from rolling, i.e. braked, the carriage has effectively frictionally engaged or gripped the endless drive cable. The camera dolly is caused to move in one direction by application of the brakes to the sheaves on one side of the carriage. The cable on that side of the carriage is effectively gripped and the carriage is carried along in the direction in which the gripped segment of the cable is traveling. To move in the opposite direction, the segment of the loop currently gripped is released by disengaging the sheave brakes on that side and the sheave brakes on the other side of the carriage are applied, and the segment of the cable traveling in the opposite direction is thus gripped. The sheave brakes are variable. This enables the operator to control the acceleration and deceleration of the camera dolly to the extent that starting and stopping become very smooth resulting in excellent start and end filming frames.

A cableway according to the invention herein disclosed has the advantage of being able to smoothly accelerate to and maintain speeds of up to 45 mph during horizontal operation. During downhill operation the system can achieve speeds of up to 55 mph downhill with rapid retrieval of the carriage and dolly back to the top of the run. The camera dolly and the camera operator's station are each capable of full 360° rotation and there is virtually no system vibration during operation. The entire system is quiet, light, portable and requires less than one day to set up for operation.

It is noted that the aerial tramway system herein disclosed and claimed will be useful in a number of industrial, commercial, and recreational applications. Nothing herein is intended to limit the scope of protection sought for this novel cable tramway system.

DESCRIPTION OF THE PREFERRED EMBODIMENTS OF THE INVENTION

Figure 1:
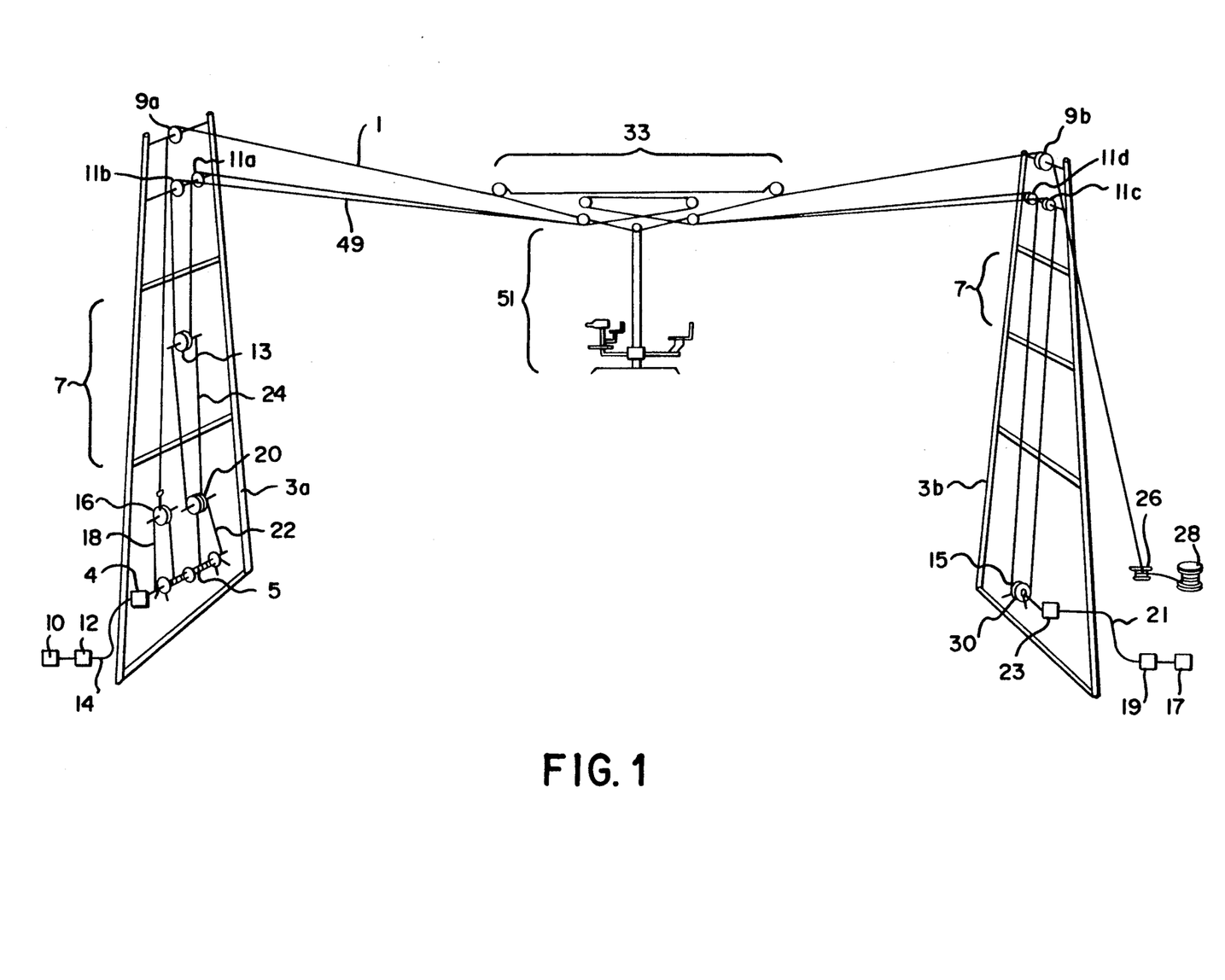
FIG. 1 is a perspective view of the system as it might be set up for use.

According to the invention a main support rope 1 is strung between two support structures 3a and 3b at a tension of 1,000 to 20,000 lbs. The main support rope must be light and strong and is preferably manufactured from synthetic extended chain fibers, covered by a nylon sheathing. According to the preferred embodiment, the support rope may be of the type commercially available under the designation 1⅛" Spectron #2. A second length of cable, over twice the length of the main support cable, may be spliced to form an endless drive cable 49 which may be strung between the two support structures 3a and 3b. Like the main support cable, the endless drive cable 49 may be a galvanized steel cable or preferably synthetic extended-chain fiber rope. According to the preferred embodiment the endless drive cable may be of the type commercially designated as ⅝ Spectron #12. The tension of the endless drive cable 49 may be between 500 and 1,500 lbs.

According to the preferred embodiment, the support structures 3 are preferably A-frame towers constructed of a series of trapezoidal segments 7 of diminishing widths and adapted to be mounted on top of one another. A variety of selected tower heights may be achieved, depending on the number of trapezoidal segments that are mounted on top of one another. The trapezoidal segments 7 are preferably manufactured of aluminum, quickly and easily transported and assembled into the A-frame towers.

The A-frame towers may be secured in the upright position during operation of the system by at least one back stay cable 6 secured, at one end, to the towers and anchored at the other end, to the ground, boulders, trees or other structures by various known methods. Main support rope tower sheaves 9a and 9b may be mounted near the top of each support structure 3a and 3b. Two sets of end sheaves 11a and c and 11b and d are mounted just beneath the main support rope tower sheaves 9a and 9b. A take-up sheave 13 is mounted near the middle of one of the support structures 3a. A power winch 5 is situated at the base of one of the support structures 3a for raising the main support rope 1 between the two support structures 3a and 3b and for applying the desired tension to both the main support cable 1 and the endless cable 49. The power winch 5 may be driven by any conventional power source. According to a preferred embodiment, a gasoline engine 10 may be connected to a hydraulic pump 12 which in turn powers, via hydraulic hoses 14, a hydraulic motor 4 that may be coupled to the power winch 5. According to a preferred embodiment of the invention, the main support rope 1 cable attaches to a pulley block 16. A first winch rope 18 may be secured to the side of the power winch, pass through the pulley block 16 and pass down onto the power winch spool. The main support rope 1 may pass from the pulley block 16 up and through main support rope sheave 9a and over to main support rope sheave 9b. The main support rope 1 may then pass down to a cleat 26 to which the main support rope 1 is fastened or otherwise secured in place. The main support rope 1 may then pass away from the cleat and onto a spool 28 around which the remaining length of the main support cable 1 is wound. A second pulley block 20 may be suspended by a cable 24 from the take-up sheave 13. Cable 24 may be attached to one side of the take-up sheave 13, pass down through pulley block 20 and back up to attach to the opposite side of the take-up sheave 13. A second winch rope 22 may be secured to a second side of the power winch, pass up and through the second pulley block 20 and down onto the power winch spool.

By winding and unwinding the power winch 5, the tension on the main support rope and the endless cable may be adjusted simultaneously.

The endless cable may be driven by a bull wheel 15 which may be located at the base of support structure 3b. The bull wheel 15 may be driven by any type of power system. According to a preferred embodiment of the invention the bull wheel 15 may be 20 inches in diameter and may be powered by a gasoline engine 17 which drives a hydraulic pump 19 which in turn powers, via hydraulic hoses 21, a hydraulic motor 23 coupled to the bull wheel 15. The gas powered hydraulic drive system preferably may be enclosed in a thick foam housing and preferably rests inside a shelter such as a trailer or a snowcave. The hydraulic hoses 21 carry hydraulic fluid from the hydraulic pump 19 to power the hydraulic motor 23 which is coupled to the bull wheel 15. A bull wheel brake mechanism 30 may be coupled to the bull wheel for use when it is desired to lock the endless cable in place. The bull wheel brake mechanism is preferably of the disc brake/caliper type. According to a preferred embodiment of the invention, speed and directional control instructions for the power system are received via telemetry from a remote operator. Accordingly, a battery powered radio receiver/modem, an interface board and an output board, may be electronically coupled to the power system, and contained within a weatherproof housing.

Figure 2:
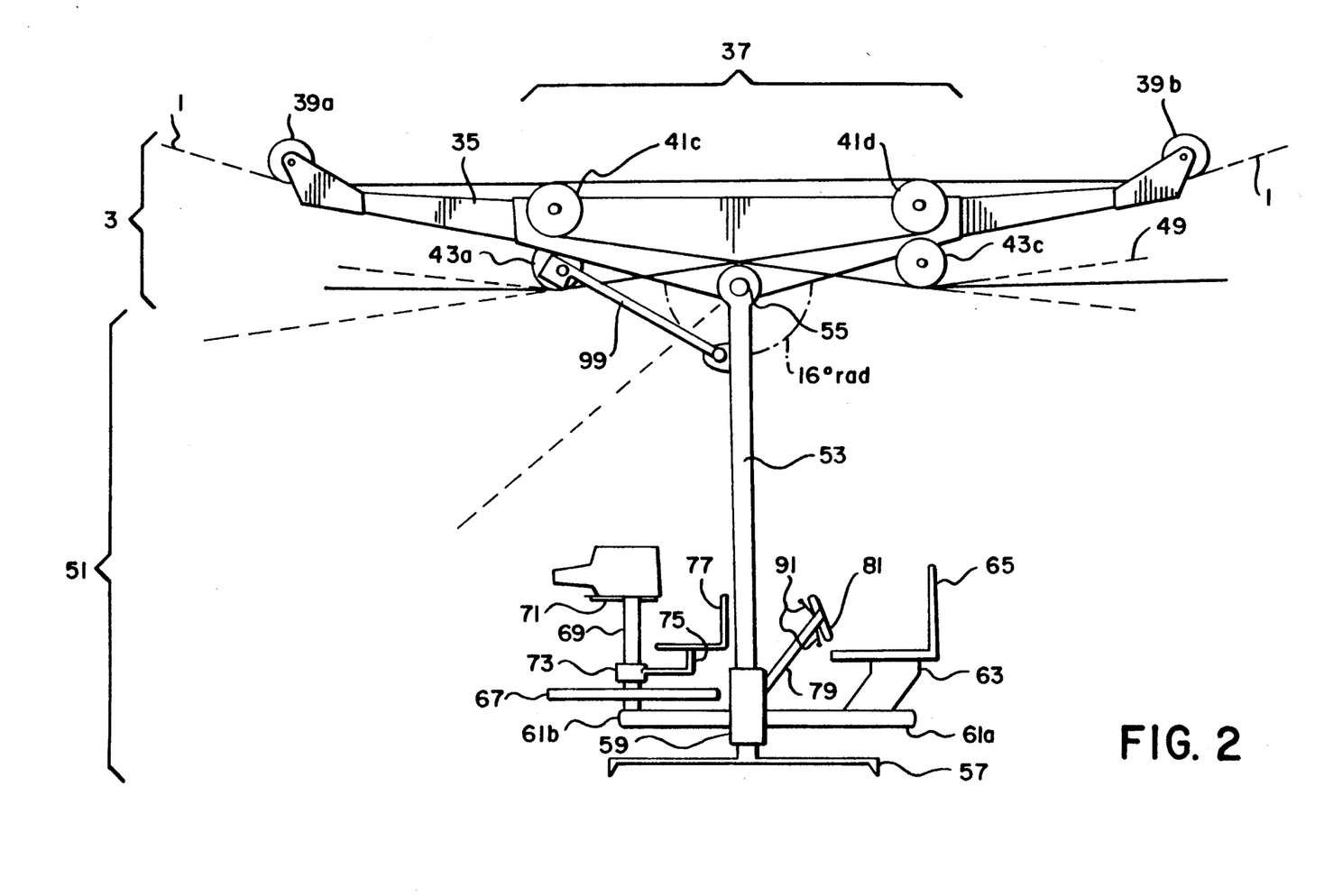
FIG. 2 is a side view of the cable carriage and camera dolly with the suspension cable and endless drive cable passing through it.
Figure 3:
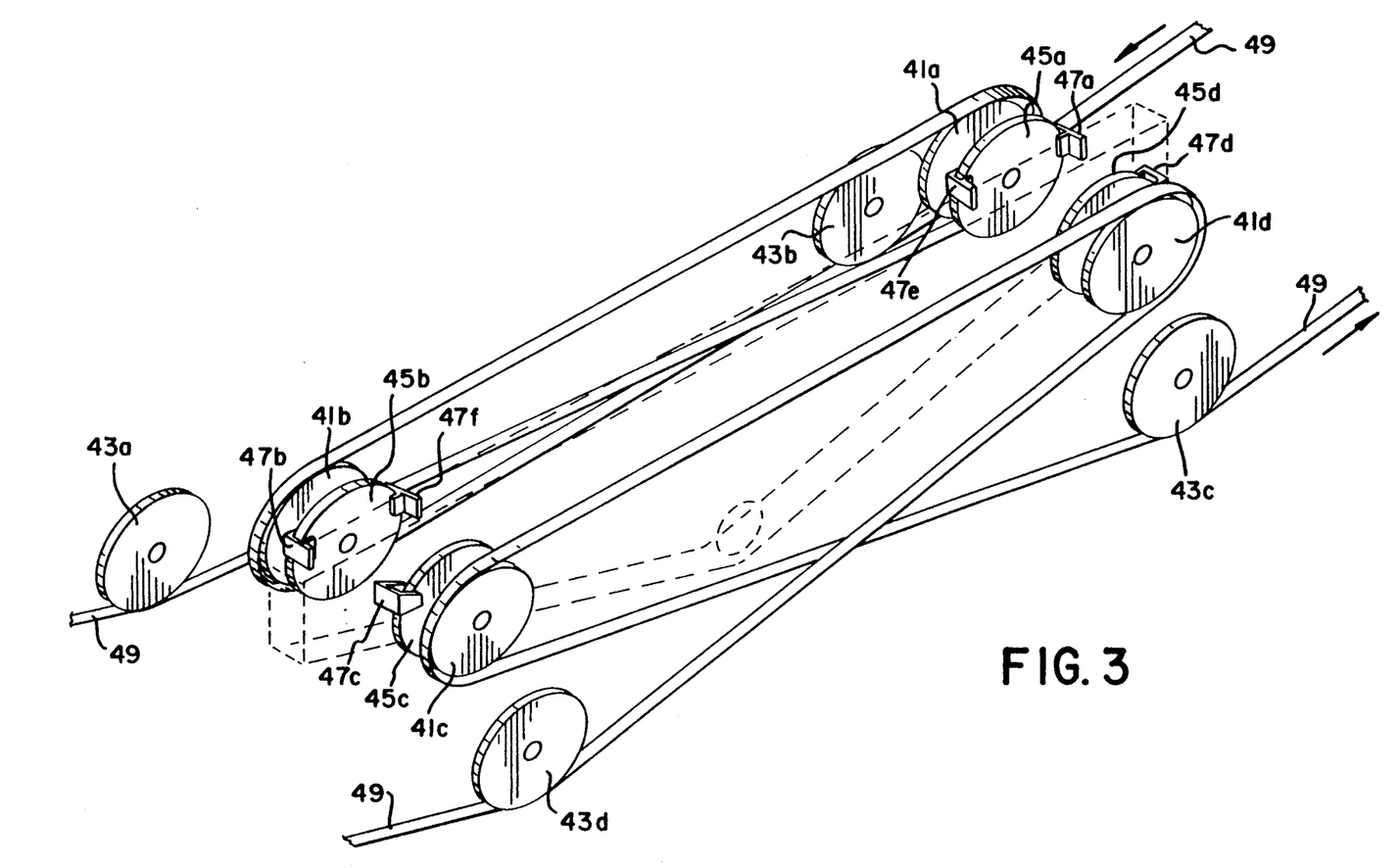
FIG. 3 is a schematic view of the drive assembly showing the relative positions of the drive and idler sheaves and the path followed by the endless drive cable as it passes through the carriage.
Figure 4:
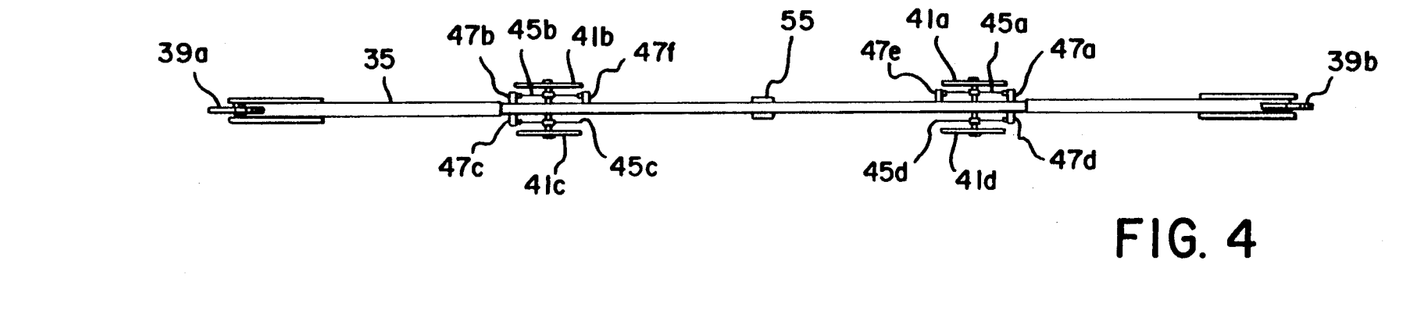
FIG. 4 is a view of the cable carriage from above.

According to the invention a cable carriage 33 may be provided. The cable carriage may include a main support chassis 35 and a drive assembly 37. The main support chassis 35 may be a contoured aluminum beam, 16 to 20 feet in length. According to a preferred embodiment of the invention, the main support chassis 35 is a 16 foot aluminum beam which is capable of being disassembled into two four foot sections and one eight foot section to make the system more portable. Main support rope sheave assemblies 39a and 39b may be attached 16 feet apart at the ends of the main support chassis 35 to support the carriage 33 on the main support cable 1. The main support rope sheave assemblies 39a and 39b may include one or more sheaves arranged in series at each end of the main support chassis 35. According to an advantageous embodiment of the invention, a single sheave may be mounted at each end of the main support chassis 35. The main support rope sheaves 39a and 39b may be easily detachable to allow the placement of the chassis 35 on the main support cable 1 in less than 5 minutes and without tools. Main support sheaves may be preferably machined to receive 1⅛ synthetic extended-chain fiber rope such as that commercially available under the designation Spectron #2. A drive assembly 37 may be mounted on the chassis 35 and may include two sets of drive sheaves 41a and b and 41c and d, one set on each side of the main support chassis, and two sets of forward and aft idler sheaves 43a and b and 43c and d for guiding the endless drive cable to and from the drive sheaves. The drives sheaves on each side of the carriage may be offset from one another to compensate for 360 degree wind of endless drive cable. The idler sheave and drive sheave grooves are preferably machined to receive ⅜" synthetic extended-chain fiber rope such as that commercially available under the designation Spectron #12. Back-up or alternative sheaves may be machined to receive ¼" galvanized steel rope. A motorcycle brake disc 45a-d and at least one caliper 47a-d may be mounted on each drive sheave 41a-d. According to a preferred embodiment of the invention, the brake discs on one side of the carriage 33 may be equipped with 1 additional caliper each, 47e and 47f. The calipers may be preferably capable of quick release to reduce the need for bleeding and to allow for safer shipping or transport at the set-up location. According to the preferred embodiment, the cable carriage may weight as little as 120 pounds.

The endless drive cable 49, driven by the bull wheel mechanism, runs from the bull wheel 15 up through a tower sheave 11d mounted on a support structure and then over to one side of the carriage 33. It passes through the carriage by passing under an idler sheave 43b and by then wrapping 180 degrees around two separate drive sheaves 41b and 41a for a total cumulative wrap of 360 degrees. The endless drive cable then exits the carriage by passing under another idler sheave 43a and continues away from the carriage to a tower sheave 11a attached at the top of the opposing support structure and passes through a take-up sheave 13. The cable continues back up and through a second tower sheave 11b at the top of the same support structure and back to the opposite side of the carriage as previously mentioned. Again, it passes through the carriage passing under an idler sheave 43d and by wrapping 180 degrees around two separate drive sheaves 41d and 41c for a total cumulative wrap of 360 degrees. As the cable leaves the sheaves on the carriage it passes under a fourth idler sheave 43c and continues to the tower sheave 11c at the top of the tower with the bull wheel drive system and back down to the bull wheel 15. The endless drive cable 49 may be tensioned at between 500 and 1,500 lbs, preferably 750 lbs. The tension on the endless drive cable, combined with the 360° wrap configuration of the drive cable around the drive sheaves 41a-d, minimizes slippage of the carriage along the drive cable and maximizes climbing ability during inclined applications while requiring less energy to drive the sheaves than other alternative configurations.

Control of the bull wheel speed and control of the sheave brakes may be effected via telemetry by either a ground-based operator or an operator situated on a support structure which is suspended from the carriage.

When the bull wheel drive system is engaged, the endless drive cable is driven through the carriage in two opposite directions. It passes through the carriage on one side going in one direction and the other side going in the opposite direction. When the system is set up on a grade and none of the brakes are applied, the carriage will travel down the cables under the force of gravity whether or not the bull wheel drive system is engaged. Alternatively, when the system is set horizontally, and the bull wheel drive system is engaged while none of the sheave brakes are applied, all four drive sheaves and all four idler sheaves will spin freely and the carriage will remain at rest.

Figure 5:
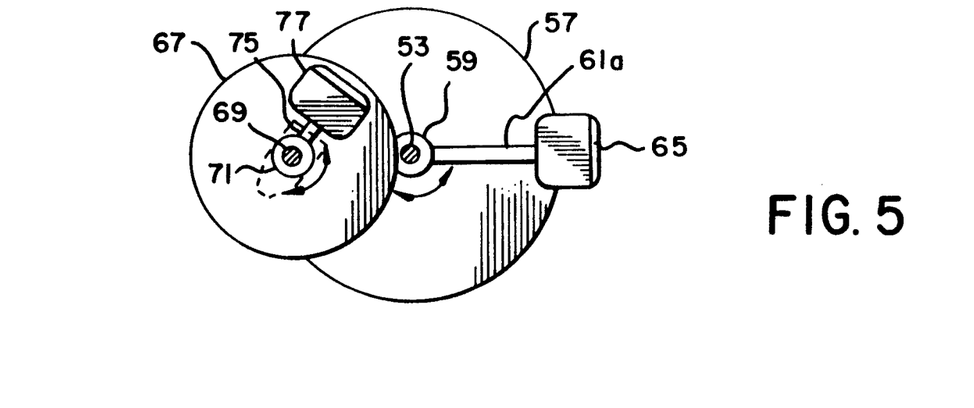
FIG. 5 is a view of the dolly from above.

According to a preferred embodiment of the invention, a dolly or other support structure is attached to the carriage. According to a further feature of the invention, a camera dolly 51, adapted for use in filming moving objects, may be provided. A central post 53, preferably made of aluminum, may attach at a pivot point 55 at the center of the underside of the carriage. The central post 53 extends downward from its attachment point 7 to 10 feet, and attaches to the center of a dolly operator's rotational platform 57. The central post may be equipped with sleeves which enable extension of the central post. The dolly operator's station may be a circular platform 5 feet in diameter. A circular bearing 59 may be mounted on the central post 53, several inches above the surface of the dolly operator's platform. Two square aluminum bars 61a and 61b, may be attached to the circular bearing 59 and each independently may extend 2½ to 4 feet away from one another in opposite directions. An adjustable sliding bracket 63, to which may be attached a dolly operator's seat 65, may be mounted near the end of one bar 61a. Attached near the end of the other bar 61b is the camera operator's circular platform 67. A vertical post 69, which bears the camera mount 71 at its top, may be attached at the center of the camera operator's platform 67. The camera mount 71 may be a standard film industry ball or flat receiver. A second circular bearing 73, to which may be attached a double elbow post 75, may be mounted near the bottom of the vertical post 69. A camera operator's seat 77 may be mounted to the top of the double elbow post 75.

The camera operator, by virtue of the circular bearing 73, may rotate a full 360° about the vertical post 69 as he sits in the camera operator's seat simply by using his feet to walk himself about the camera operator's platform. The dolly operator, by virtue of the circular bearing 59, may rotate both himself and the camera operator's station a full 360° about the central post 53 by using his feet on the dolly operator's platform to force himself and the camera operator's platform in either direction around the central post.

Figure 6:
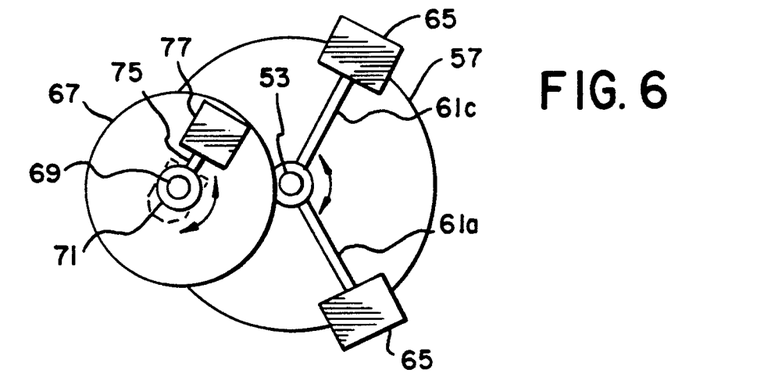
FIG. 6 is a view of a preferred embodiment of the dolly from above.

According to a preferred embodiment of the invention, an assistant camera operator's station may be mounted on the camera dolly. According to this embodiment a third aluminum bar 61c is attached to the circular bearing 59. Further according to this embodiment, aluminum bars 61a,b,c may be attached to the circular bearing 59 at 120° intervals for balance. An assistant camera operator's chair 65b may be mounted on a sliding bracket. The sliding bracket may be mounted on the aluminum bar 61c.

A handle bar assembly 79 may be attached to the first circular bearing 59 and extend upward to a comfortable position for the dolly operator. A motorcycle-type twist grip assembly 81 may be mounted on the left hand side of the handle bars. The twist grip assembly 81 remotely controls the gas powered bull wheel drive system via telemetry. Two switches may be mounted on the twist grip assembly. Switch A is a start/stop toggle for controlling the gas powered engine. Switch B selects control between the gas engine and the hydraulic motor. When Switch B is in a first position, the twist grip may be used to control the rpms of the gasoline engine, which in turn controls amount of hydraulic pressure available to the hydraulic motor. When Switch B is in a second position, the twist grip may be used to control the power output of the hydraulic motor which directly controls the bull wheel's angular velocity. The twist grip assembly may be wired to an interface board and a radio transmitter/modem with an antenna. This onboard telemetry system is battery powered and, except for the twist grip assembly and antenna, is contained in a weatherproof housing.

Motorcycle-type clutch/brake assemblies 91 may be attached to both the left hand grip and the right hand grip. The right hand clutch/brake assembly may be set to control either all four sheave brakes at once or it may be set to control only two sheave brakes on one side of the carriage. When the right clutch/brake assembly is set to control all four sheave brakes, the left clutch/brake assembly is set to independently control only two sheave brakes on one side of the carriage. When the right clutch/brake assembly is set to control the sheave brakes on one side of the carriage, the left clutch/brake assembly is set to control the two sheave brakes on the opposite side of the carriage.

The invention has two alternative modes of operation: horizontal operation and downhill operation.

According to a preferred embodiment of the invention, during horizontal operation, the left hand clutch/brake assembly controls calipers 47a and 47b, and the right hand clutch/brake assembly controls calipers 47c and 47d. During downhill operation, the left hand clutch/brake assembly controls calipers 47a and 47b, and the right hand clutch/brake assembly controls calipers 47c, 47d, 47e, and 47f.

When the towers are set up at relatively equal elevations, the clutch/brake assemblies at the dolly operator's station are set so that the left hand clutch/brake operates the brakes on one side of the carriage, calipers 47a and 47b and the right hand clutch/brake handle operates the brakes on the other side of the carriage, calipers 47c and 47d. In horizontal operation, therefore, the dolly operator causes the sheave brakes to engage the drive sheaves on one side of the camera dolly at a time. Grasping one segment of the drive cable in this manner, by braking the drive sheaves, causes the camera dolly to be carried along in the direction that the grasped segment of the drive cable is travelling. Because the sheave brakes are variable, the dolly operator can smoothly start, stop, and reverse direction of the camera dolly by varying the pressure on the motorcycle-type clutch/brake assemblies. In this manner a camera can be maneuvered back and forth over extended distances at heights from 6 inches to 50 feet, depending on the tower height and degree of catenary, in order to track the action being filmed. Tower height is adjustable by the number of trapezoidal segments 7 used, and the degree of catenary, or "droop," of the cable system is adjustable by changing the tension on the main suspension cable 1 with the power winch 5 or by adjusting the tension on the back stay cables.

In downhill operation, the bull wheel motor may be turned off, and the bull wheel brakes are fully engaged, thus locking the endless drive cable in place. Thus the motionless drive cable effectively becomes two independent cables, thereby doubling the braking strength. The clutch/brake system may be adjusted so that the right hand clutch/brake handle operates the brakes on all of the drive sheaves at once; that is, the right hand clutch/brake handle is connected to calipers, 47c, 47d, 47e and 47f. The left hand clutch/brake handle, as in horizontal operation, operates only the brakes on one side of the carriage, i.e. calipers 47a and 47b. To track downhill action, the dolly operator allows the dolly to travel down the motionless cable through the force of gravity, slowing or stopping the dolly as necessary by squeezing the right clutch/brake handle, thus applying all four sheave brakes simultaneously. If at any time the operator wishes for the dolly to travel uphill, the right handle clutch/brake handle is released, the left hand clutch/brake handle is squeezed, the brake on the bull wheel is released, and the bull wheel drive motor is engaged to bring the endless drive cable into motion. Thus, the cable carriage and camera dolly is pulled towards the top by gripping the segment of the endless drive cable which is travelling uphill.

According to the preferred embodiment of the invention, there is also provided a gyro controlled actuator 99. The gyro controlled actuator has the ability to sense when the central post moves outside of vertical as a result of acceleration or deceleration. When it senses such motion or "swing" off the vertical, the actuator sends a signal to a small but powerful motor inside the actuator, a linear hydraulic cylinder, which responds appropriately by causing the actuator to extend or shorten to compensate for the sway. As a result, the dolly is constantly kept vertical and prevented from swaying.

Figure 7:
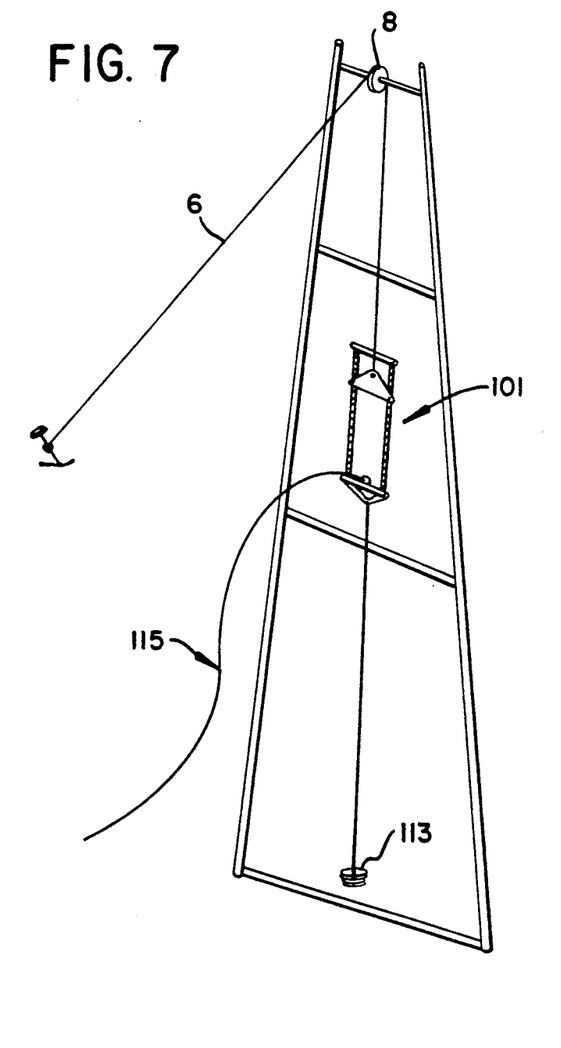
FIG. 7 is a perspective view of the back stay cable tensioning mechanism.
Figure 8:
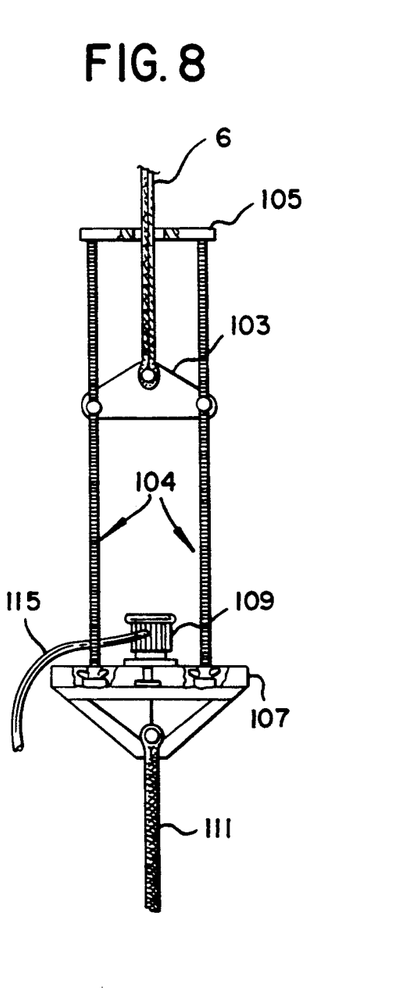
FIG. 8 is a close-up view of the back stay cable tensioning mechanism.

It may be advantageous for a camera to follow the contour of the surface upon which the moving subject is traveling. This contouring may be accomplished according to the invention by causing the support towers to alternately lean away from and towards from one another, thus raising and lowering the carriage and dolly. Accordingly, back stay cable sheaves 8 may be located near the top of the support structures 3a and 3b. Back stay cables 6 may pass from their anchored position up and over the back stay cable sheaves 8 and down to back stay cable tensioning mechanisms 101. According to the preferred embodiment back stay cable 6 may be attached to a triangular event 103 which may be mounted on two eight foot lead (leed) screws 104. The lead screws may extend between two end pieces 105 and 107. The lead screws may be driven by a four to ten horsepower dc motor 109 which may be mounted on one of the two end pieces. A cable 111 may attach to the bottom end piece and run down to the base of the tower where it may be attached to a cleat 113 or otherwise secured in place. Alternatively, cable 111 may run up from the cleat 113 and over the back stay cable sheave 8 to attach to the back stay cable tensioning mechanism 101 anywhere between the back stay cable sheave 8 and the point at which back stay cable 6 is anchored. Thus, according to this embodiment, the back stay cable 6 meets the back stay cable tensioning mechanism 101 without ever passing over the back stay cable sheave 8. Tension on the back stay cable 6 may be adjusted during operation by causing the electric motor to drive the twin lead screws in one direction or the other. The triangular event to which the back stay cable is attached will be driven up or down depending upon the direction in which the lead screws are being driven. When the tension on the back stay cables is lessened, the towers will begin to lean towards one another and the carriage and dolly will be lowered. As the tension on the back stay cables is increased, the towers will lean away from on another and the carriage and dolly will be raised. The electric motor 109 may receive power from a battery or other power source via a power cable 115.

A potentiometer may be situated anywhere along the power cable between the electric motor and the power source. A tower based or ground based operator may control the tension on the back stay cables by manually turning the dial on the potentiometer, thus controlling the flow of power to the electric motor. Alternatively, the potentiometer may be controlled by a computer which may be programmed to increase and decrease tension on the back stay cables at selected times.

Figures 9, 10:
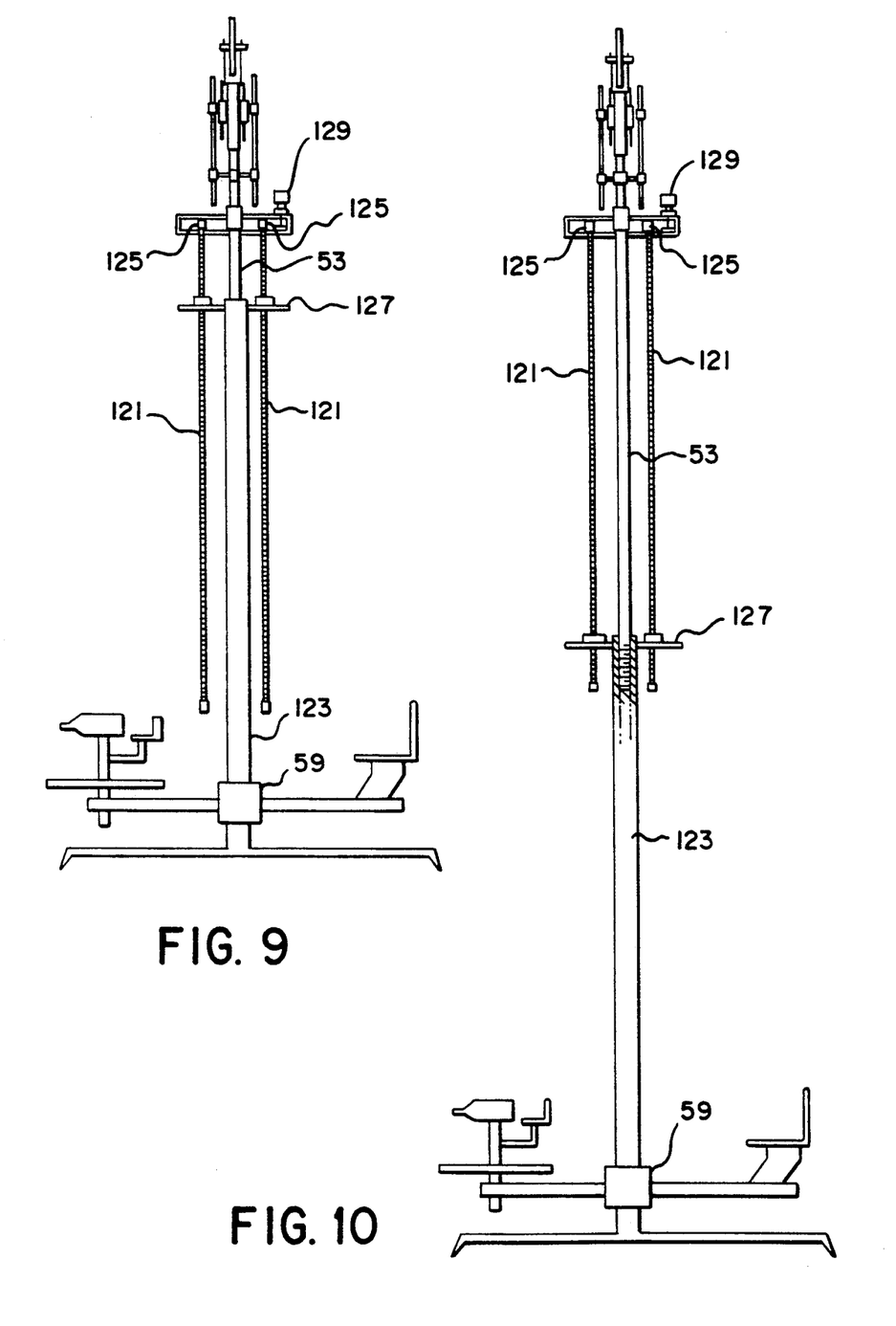
FIG. 9 is an end view of a preferred embodiment of the invention in a raised position.
FIG. 10 is an end view of the embodiment of FIG. 9 in a lowered position.

It may also be advantageous to raise and lower the camera dolly without a corresponding lowering of the cable system, for example when the system is set up above trees or other elements in which the cables could become entangled if they were lowered. Accordingly, the camera dolly may be equipped with two ¾ inch, ten foot long lead screws 121 parallel to the central post. According to this embodiment, the central post 53 may extend down through the center of a central post extending sleeve 123. The inside diameter of the central post extending sleeve 123 may be just large enough to receive the outside diameter of the central post 53. The circular bearing 59, which ultimately supports the dolly operator's platform 57 and the camera operator's platform 67, may be attached to a central post extending sleeve 123. The lead screws 121 may be set, at one end, into ball/screw drives 125 which may be mounted to the underside of the carriage 33. At the other end, the lead screws may be threaded through a metal plate 127 mounted at the top of the central post extending sleeve 123. The lead screws may be driven by a battery powered 4 hp electric motor 129. As the lead screws are driven in one direction, the central post extending sleeve, and attached dolly and camera operator's platforms, are drawn up over the central post. The extent to which the central post extending sleeve may be drawn up over the central post may be limited by the gyro actuator 99 which may be attached to the central post 53. As the lead screws are driven in the opposite direction, central post extending sleeve, along with the operators' stations, are forced away from the carriage.

Figure 11:
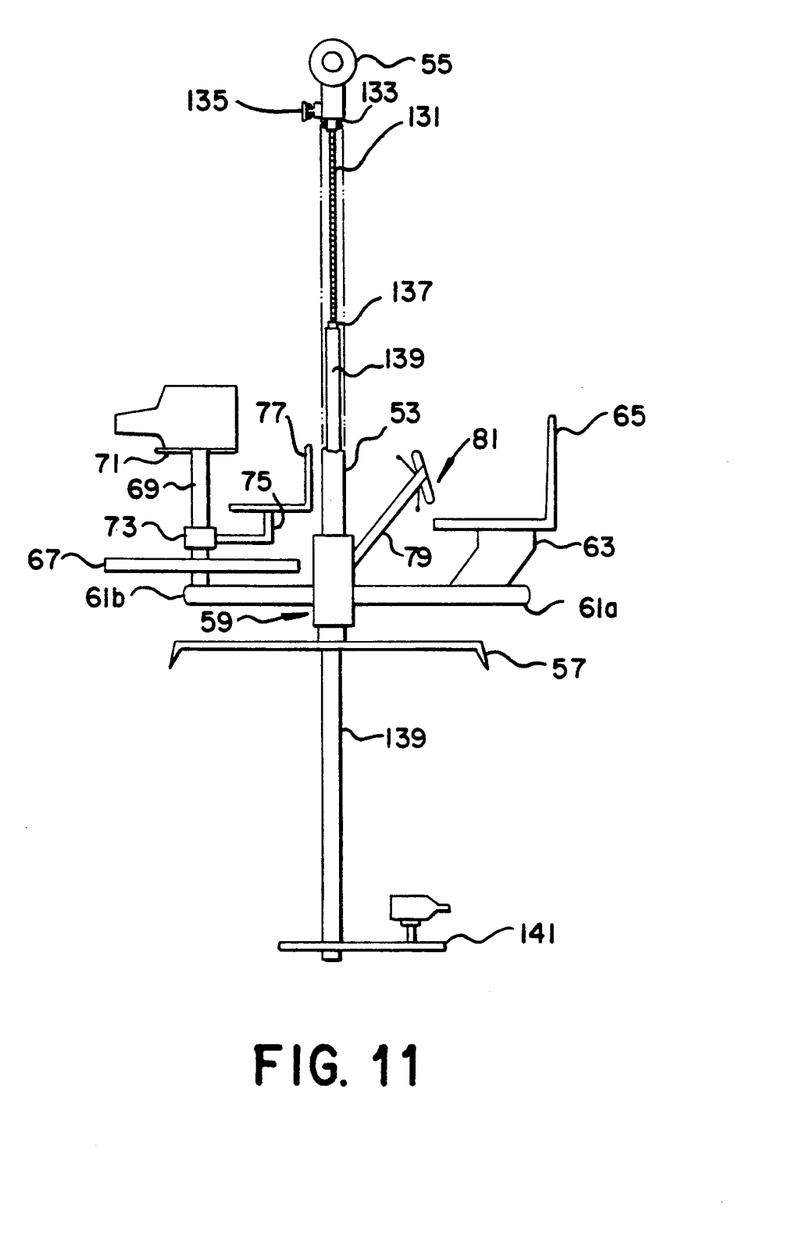
FIG. 11 is a cut-away view of another embodiment of the invention.

According to another embodiment of the invention, a single lead screw 131 may be located parallel to the axis of the central post 53, and extend down through the center of the central post. The single lead screw may be set at one end into a ball/screw drive 133, which may be located inside the top portion of the central post 53. The lead screw may be driven by a battery powered 1.5 hp electric motor 135 which may be mounted on the outside of the central post 53. The single lead screw 131 may be threaded through a nut 137 which is connected to the top of a ten foot long hollow rod 139. The hollow rod 139 may have an interior diameter large enough to receive the single lead screw 131 and an exterior diameter small enough to be drawn up through the center of the central post 53. As the single lead screw 131 is driven in one direction, the hollow rod 139 may descend out from the center of the central post 53. As the single lead screw is driven in the opposite direction, the hollow rod 139 may be drawn up into the center of the central post 53. A remote camera mounting bracket 141 may be attached to the bottom of the hollow rod 139. A remote pan and tilt camera such as the type commercially available under the trade names Cam Remote and Power POD may be mounted on the remote camera bracket 141. The camera operator may operate the remote camera from the camera operator's station using a standard joystick remote control or any other remote control mechanism.

What is claimed is:

1. An aerial cableway comprising:
   a first cable support and a second cable support located at opposing ends of a cableway;
   an endless cable extending in an elongated loop between said cable supports and defining first and second parallel segments;
   a cable drive connected to said endless cable;
   a carriage supported simultaneously on said first segment of said endless cable and on said second segment of said endless cable;
   a first variable brake connected to said carriage and associated with said first segment of said endless cable;
   a second variable brake connected to said carriage and associated with said second segment of said endless cable.

2. An aerial cableway according to claim 1 further comprising a second cable extending between said cable supports.

3. An aerial cableway according to claim 1 further comprising a bull wheel mechanism engaging said endless cable.

4. An aerial cableway according to claim 3 further comprising a gasoline engine connected to said bull wheel mechanism.

5. An aerial cableway according to claim 4 further comprising a receiver associated with said gasoline engine.

6. An aerial cableway according to claim 4 further comprising a hydraulic pump coupled to said gasoline engine.

7. An aerial cableway according to claim 1 wherein said first variable brake is also associated with said second segment of said endless cable.

8. An aerial cableway according to claim 1 wherein said first variable brake comprises at least one disc brake and caliper.

9. An aerial cableway according to claim 1 further comprising at least one drive sheave connected to said carriage.

10. An aerial cableway according to claim 9 wherein said first variable brake and said second variable brake each comprises one said drive sheave.

11. An aerial cableway according to claim 10 comprising multiple drive sheaves and associated disc brakes connected to said carriage.

12. An aerial cableway according to claim 11 comprising four drive sheaves associated with four disc brakes.

13. An aerial cableway according to claim 12 wherein said first segment of said endless cable passes through the carriage by wrapping around at least two drive sheaves for a total cumulative wrap of at least 360°.

14. An aerial cableway according to claim 13 wherein said second segment of said endless cable passes through the carriage by wrapping around at least two drive sheaves for a total cumulative wrap of at least 360°.

15. An aerial cableway according to claim 1 wherein said first cable support and said second cable support are A-frame towers.

16. An aerial cableway according to claim 15 wherein said A-frame towers are a plurality of subunits.

17. An aerial cableway according to claim 1 further comprising at least one sheave attached to said cable supports.

18. An aerial cableway according to claim 1 further comprising a winch located near the foot of one of said support structures.

19. An aerial cableway according to claim 18 further comprising at least one pulley block connected to said winch.

20. An aerial cableway according to claim 1 further comprising a support attached to said carriage.

21. An aerial cableway according to claim 20 further comprising a stabilizer connected between said carriage and said support.

22. An aerial cableway according to claim 21 wherein said stabilizer is a gyro controlled actuator.

23. An aerial cableway according to claim 20 further comprising a camera mount attached to said support.

24. An aerial cableway according to claim 20 further comprising a first platform connected to said support for supporting an operator.

25. An aerial cableway according to claim 24 further comprising a second platform connected to said support for supporting a camera operator.

26. An aerial cableway according to claim 20 further comprising a transmitter connected to said support.

27. An aerial cableway according to claim 25 further comprising a circular bearing connected to said support.

28. An aerial cableway according to claim 27 wherein said second platform is connected to said circular bearing.

29. An aerial cableway according to claim 20 further comprising control means by which an onboard operator may control the speed and direction of travel of said support.

30. An aerial cableway according to claim 29 wherein said control means comprises a twist grip assembly and a brake assembly.

31. An aerial cableway according to claim 1 further comprising a back stay cable tensioning mechanism.

32. An aerial cableway according to claim 31 wherein said back stay cable tensioning mechanism comprises a back stay cable, at least one lead screw, an adjusting element attached to said back stay cable and associated with said lead screw, and a power source for driving said lead screw.

33. An aerial cableway according to claim 20 further comprising a mechanism for raising and lowering said support relative to said carriage.

34. An aerial cableway according to claim 33 wherein said mechanism for raising and lowering said support relative to said carriage comprises at least one lead screw attached to said carriage, and a power source for driving said lead screw.

35. An aerial cableway according to claim 24 further comprising a mechanism for raising and lowering a remote camera located beneath said first platform.

36. An aerial cableway according to claim 35 wherein said mechanism for raising and lowering a remote camera located beneath said first platform comprises at least one lead screw and a power source for driving said lead screw.

37. A method for filming comprising:
tensioning an endless cable in an elongated loop between two supported structures;
mounting a cable carriage with a support and a camera on the endless cable so that the carriage simultaneously contacts first and second parallel segments defining said elongated loop;
driving the endless cable;
moving the carriage by applying variable braking pressure to drive sheaves connected to said cable carriage; and
operating said camera.

38. A method according to claim 37 further comprising accelerating, decelerating and changing the direction of said carriage.

39. A method according to claim 38 further comprising filming continuously with said camera.

* * * * *